US008390721B2

(12) United States Patent
Liu et al.

(10) Patent No.: US 8,390,721 B2
(45) Date of Patent: Mar. 5, 2013

(54) PORTABLE ELECTRONIC DEVICE AND CAMERA MODULE THEREFOR

(75) Inventors: Hsien Hsun Liu, Taoyuan (TW); Wei Hua Lee, Taoyuan (TW)

(73) Assignee: High Tech Computer Corporation, Taoyuan (TW)

( * ) Notice: Subject to any disclaimer, the term of this patent is extended or adjusted under 35 U.S.C. 154(b) by 1265 days.

(21) Appl. No.: 12/165,986

(22) Filed: Jul. 1, 2008

(65) Prior Publication Data
US 2009/0009650 A1    Jan. 8, 2009

(30) Foreign Application Priority Data

Jul. 2, 2007    (TW) ................................ 96123981 A

(51) Int. Cl.
*G02B 13/16*    (2006.01)
(52) U.S. Cl. ........................................................ 348/335
(58) Field of Classification Search .................. 348/335; 359/351, 369
See application file for complete search history.

(56) References Cited

U.S. PATENT DOCUMENTS

| | | | | |
|---|---|---|---|---|
| 5,920,432 | A * | 7/1999 | Suenaga et al. ............... | 359/656 |
| 6,975,358 | B1 * | 12/2005 | Morley .......................... | 348/335 |
| 6,992,699 | B1 * | 1/2006 | Vance et al. .............. | 348/207.99 |
| 2003/0036365 | A1 | 2/2003 | Kuroda | |
| 2007/0064315 | A1 * | 3/2007 | Kobayashi .................... | 359/689 |
| 2007/0081815 | A1 | 4/2007 | Zomet et al. | |
| 2008/0019684 | A1 * | 1/2008 | Shyu et al. .................... | 396/332 |
| 2008/0031613 | A1 * | 2/2008 | Keller et al. .................. | 396/382 |
| 2008/0058734 | A1 * | 3/2008 | Hanft et al. ................... | 604/289 |
| 2008/0068972 | A1 * | 3/2008 | Yabe et al. ............... | 369/112.01 |
| 2008/0171571 | A1 | 7/2008 | Feil et al. | |
| 2008/0231947 | A1 * | 9/2008 | Zadravec et al. ............. | 359/353 |

FOREIGN PATENT DOCUMENTS

| | | |
|---|---|---|
| DE | 102005010920 A1 | 9/2006 |
| GB | 2 368 221 A | 4/2002 |
| JP | 2003091041 | 3/2003 |

* cited by examiner

*Primary Examiner* — Clayton E Laballe
*Assistant Examiner* — Linda B Smith

(57) ABSTRACT

The present invention provides a camera module for a portable electronic device. A beam splitter has a first light input end for receiving a first light beam, a second light input end for receiving a second light beam and a light output end for outputting the first or second light beams that enter from the first and second light input ends respectively. A reflector is positioned at the upstream of the first light input end of the beam splitter to redirect the first light beam to the first light input end of the beam splitter. An image sensor is positioned at the downstream of the light output end of the beam splitter to convert the first or second light beams outputted from the light output end into a corresponding signal.

22 Claims, 9 Drawing Sheets

PORTABLE ELECTRONIC DEVICE AND CAMERA MODULE THEREFOR

CROSS REFERENCE TO RELATED APPLICATION

This application claims the priority benefit of Taiwan Patent Application Serial Number 096123981 filed Jul. 2, 2007, the full disclosure of which is incorporated herein by reference.

BACKGROUND OF THE INVENTION

1. Field of the Invention

The invention relates to a camera module and a portable electronic device, and more particularly, to a camera module for a portable electronic device and the portable electronic device with the same.

2. Description of the Related Art

Referring to FIG. 1, a conventional 3G camera cell phone 100 is provided with a secondary camera module 130 which is similar to the video camera module of a general video telephone. A primary camera module 140, which is similar to the still camera module of a general digital camera, is configured on the backside 120 of the phone 100. In general, for use in different applications, the secondary camera module 130 has a lower image resolution and a shorter focal distance and the primary camera module 140 has a higher image resolution and a longer focal distance.

Referring to FIG. 2a, the secondary camera module 130 typically includes a lens unit 132 and an image sensor 134, such as CMOS or CCD image sensor. The lens unit 132 can comprise a single lens or two lenses and be used to guide an image light beam to the image sensor 134. Afterward, the image sensor 134 converts the image light beam into a corresponding electrical signal. To filter out the undesired infrared (IR) component in the image light beam, an IR cut filter 136 is positioned between the lens unit 132 and the image sensor 134.

Referring to FIG. 2b, the primary camera module 140 typically includes a tri-lens module 142 and an image sensor 144. Similarly, the tri-lens module 142 can guide an image light beam to the image sensor 144 and then the image sensor 144 converts the image light beam into a corresponding electrical signal. Moreover, an IR cut filter 146 is positioned between the tri-lens module 142 and the image sensor 144 to filter out the undesired infrared component in the image light beam.

Referring to FIG. 3, another conventional camera cell phone 300 is provided with a rotatable camera module 310. A user can turn the camera module 310 to the front side or back side of the phone 300 at will to take pictures.

The conventional camera cell phone 100 has two camera modules 130, 140, and each of which is required to have its own image sensors 134 and 144 to perform the function of a camera. However, this will cause an increase in production cost. Moreover, although the conventional camera cell phone 300 uses only one camera module 310 to take pictures, the introduction of such rotatable unit to the phone 300 will increase complexity in design and construction.

Accordingly, there exists a need to provide a camera module for portable electronic devices to solve the above-mentioned problems.

SUMMARY OF THE INVENTION

It is an object of the present invention to provide a camera module for portable electronic devices that can be manufactured with lower cost and smaller size by sharing components.

In the first embodiment, the camera module for portable electronic devices includes a beam splitter having a first light input end, a second light input end and a light output end. A second lens unit is positioned at the upstream of the second light input end of the beam splitter to guide a second image light beam to the second light input end of the beam splitter. The second image light beam will enter into the second light input end and then be outputted from the light output end of the beam splitter. An image sensor is positioned at the downstream of the light output end of the beam splitter to convert the image light beams outputted from the light output end into corresponding signals. In addition, a reflector is positioned at the upstream of the first light input end of the beam splitter. A first lens unit is positioned at the upstream of the reflector to guide a first image light beam to the reflector. The reflector then redirects the first image light beam to the first light input end of the beam splitter. The first image light beam will enter into the first light input end and then be outputted from the light output end of the beam splitter and finally arrive at the image sensor. The first lens unit can be a tri-lens module comprised of two convex lenses and a concave lens disposed between the two convex lenses. The second lens unit can be a single convex lens to be attached to the second light input end of the beam splitter. Alternatively, the second lens unit can be a tri-lens module comprised of two convex lenses and a concave lens disposed between the two convex lenses.

In the second embodiment, the camera module for portable electronic devices is similar to that described in the first embodiment and the difference between them is in that the convex lens positioned between the concave lens and the reflector in the first lens unit of the first embodiment is moved to a position between the reflector and the first light input end of the beam splitter in the second embodiment.

In the third embodiment, the camera module for portable electronic devices is similar to that described in the first embodiment and also includes a beam splitter, an image sensor and a reflector. A convex lens is positioned between the light output end of the beam splitter and the image sensor. Another convex lens is positioned at the upstream of the reflector and a concave lens is positioned between the reflector and the first light input end of the beam splitter.

It is another object of the present invention to provide a portable electronic device. The housing of the portable electronic device has one opening on the front side and another opening on the backside. One of the camera modules described in the foregoing embodiments is configured in the housing. When two image light beams pass through the two openings, respectively, they will finally arrive at the image sensor of the camera module. The image sensor converts the image light beams into individual corresponding signals and then a display unit disposed on the front side of the housing shows the images received by the image sensor according to the signals.

The camera modules of the present invention can be configured in a portable electronic device proposed to have a function of photographing and video communication to capture the image light beams of different directions. Moreover, the camera modules of the present invention can be manufactured with lower cost and smaller size by sharing components.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENT

Figure 1:
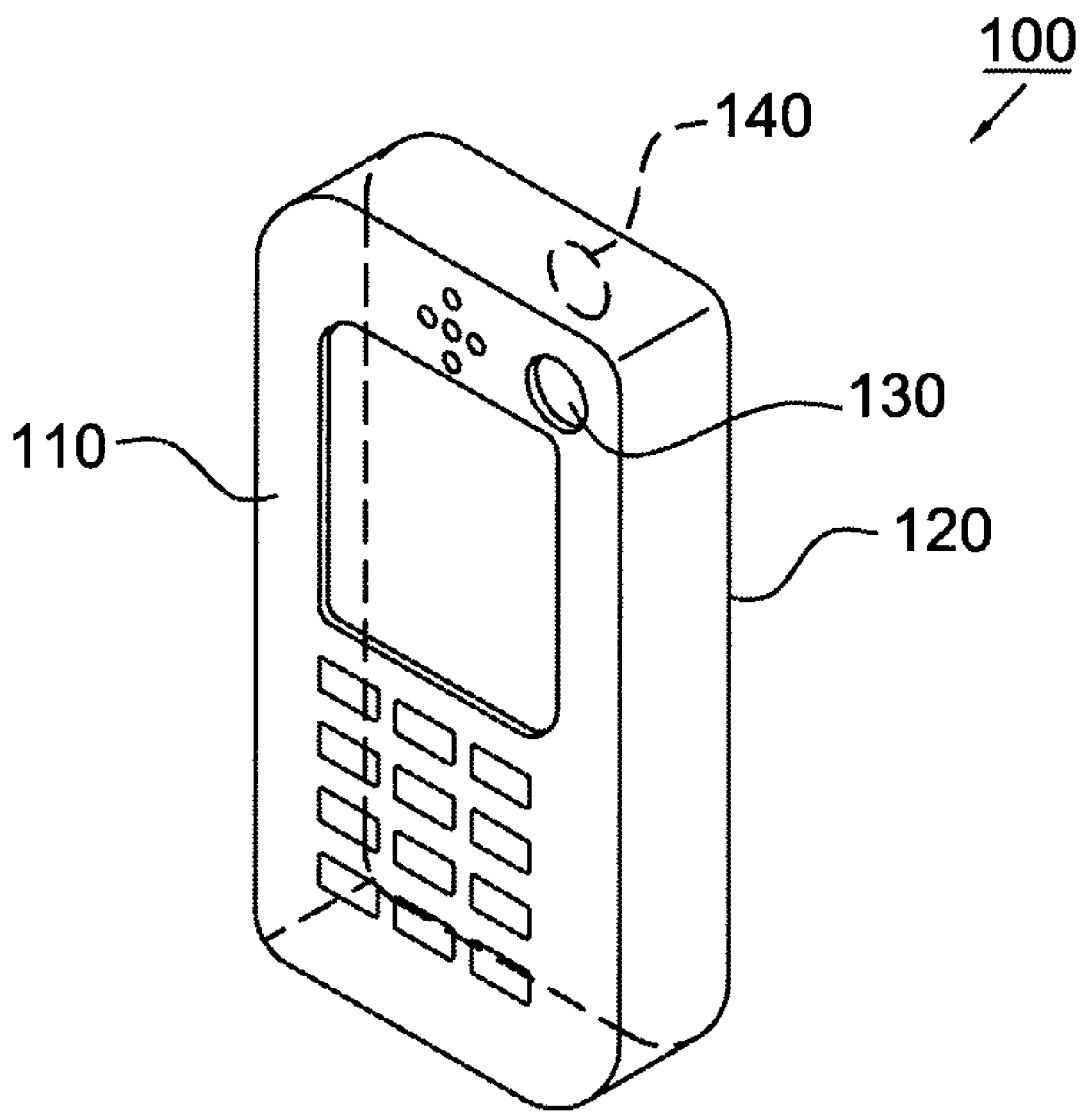
FIG. 1 illustrates a conventional camera cell phone with two camera module.
Figure 2A:
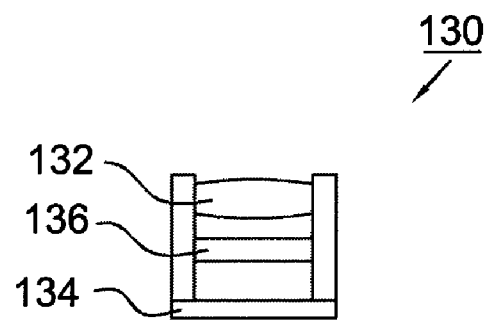
FIG. 2a illustrates the secondary camera module of a conventional camera cell phone.
Figure 2B:
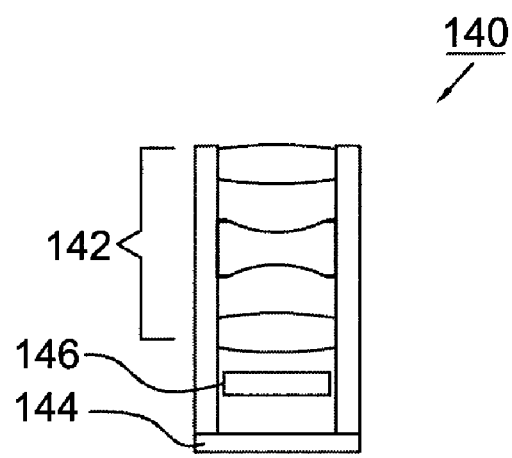
FIG. 2b illustrates the primary camera module of a conventional camera cell phone.
Figure 3:
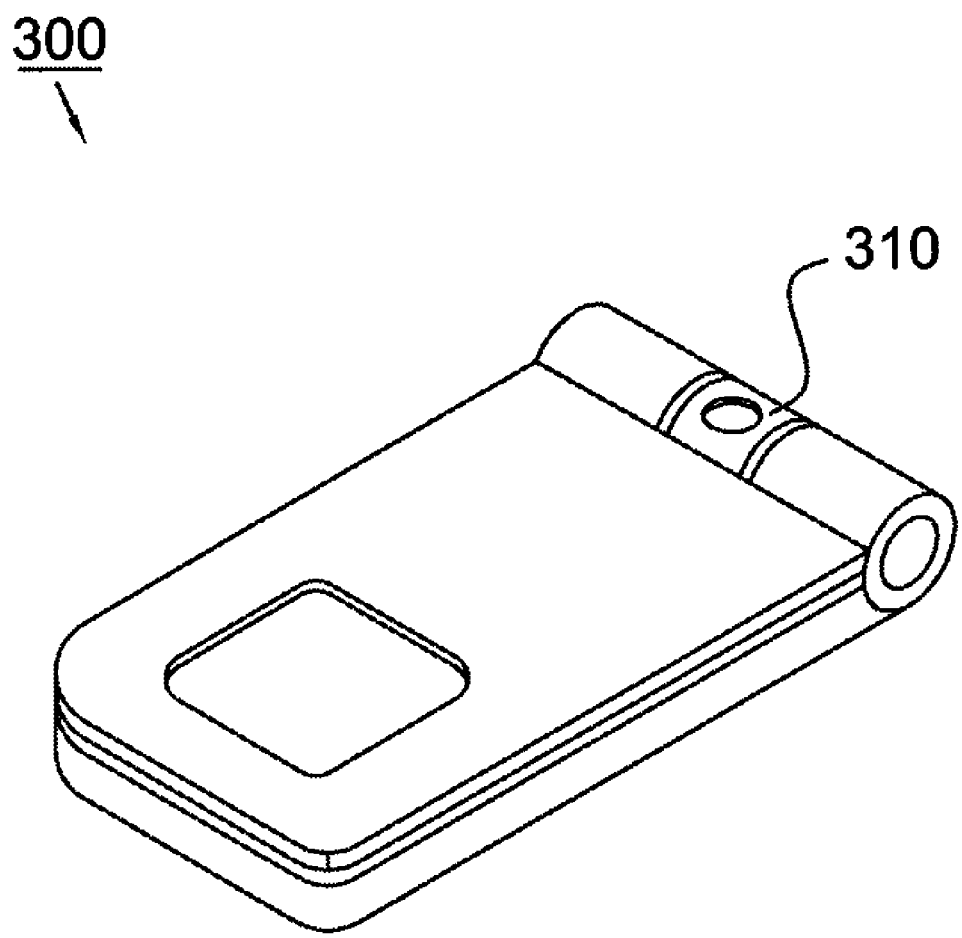
FIG. 3 illustrates another conventional camera cell phone with a rotatable camera module.
Figure 4:
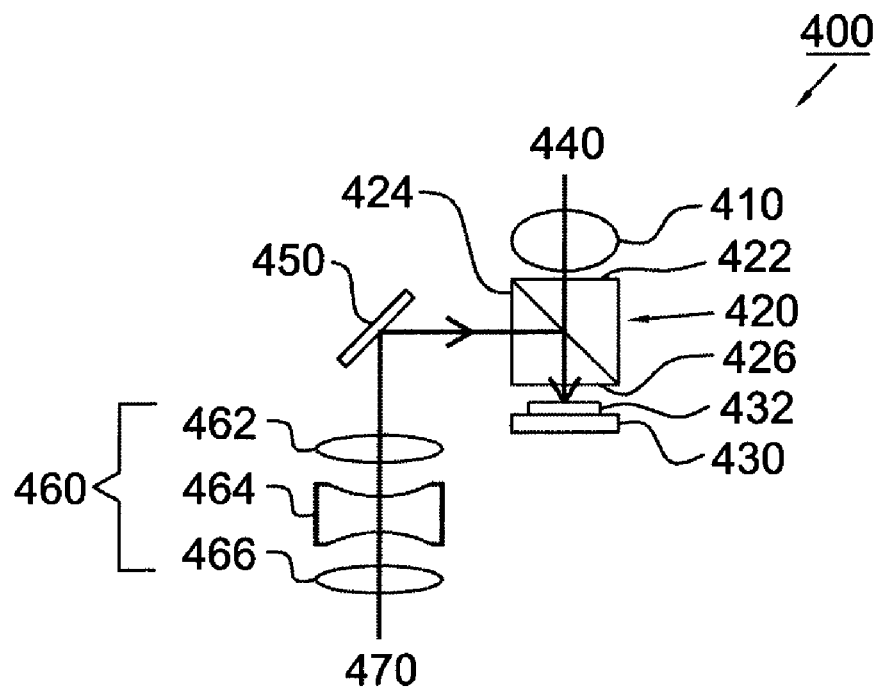
FIGS. 4, 5, 6a and 6b illustrate various aspects of the camera modules for portable electronic devices according to the first embodiment of the present invention.

Referring to FIG. 4, the camera module 400 for portable electronic devices according to the first embodiment of the present invention includes a beam splitter 420, such as cube-type beam splitter or plate-type beam splitter, which has two light input ends 422, 424 and a light output end 426. A second lens unit 410 is positioned at the upstream of the light input end 422 of the beam splitter 420 to receive an image light beam 440 and then guide it to the light input end 422 of the beam splitter 420. The image light beam 440 will enter into the light input end 422 and then be outputted from the light output end 426 of the beam splitter 420. An image sensor 430, such as CCD or CMOS image sensor is positioned at the downstream of the light output end 426 of the beam splitter 420 to convert the image light beam 440 outputted from the light output end 426 into a corresponding electrical signal. To filter out the undesired infrared component in the image light beam 440, an IR cut filter 432 is positioned between the light output end 426 of the beam splitter 420 and the image sensor 430. In addition, the camera module 400 according to the first embodiment of the present invention further includes a reflector 450 and a first lens unit 460. The reflector 450 is positioned between the light input end 424 of the beam splitter 420 and the first lens unit 460 to redirect the image light beam 470 exiting from the first lens unit 460 to the light input end 424 of the beam splitter 420. The image light beam 470 will then be outputted from the light output end 426 of the beam splitter 420 and arrive at the image sensor 430. The image sensor 430 converts the image light beam 470 into another corresponding electrical signal.

Although the camera module 400 uses only one image sensor 430 to capture images, the introduction of the reflector 450 and the beam splitter 420 enables the image sensor 430 to capture different image light beams from different directions. When a cell phone is provided with the camera module 400 of the present invention, the second lens unit 410 can be configured on the front side of the cell phone to function as the optical elements of a video camera module. The first lens unit 460 can be a tri-lens module comprised of two convex lenses 462, 466 and a concave lens 464 disposed between the two convex lenses 462, 466 and arranged on the backside of the cell phone to function as the optical elements of a still camera module. In this way, the number of the image sensor and IR cut filter used in the cell phone can be decrease and the production cost of the cell phone can be reduced accordingly.

Figure 5:
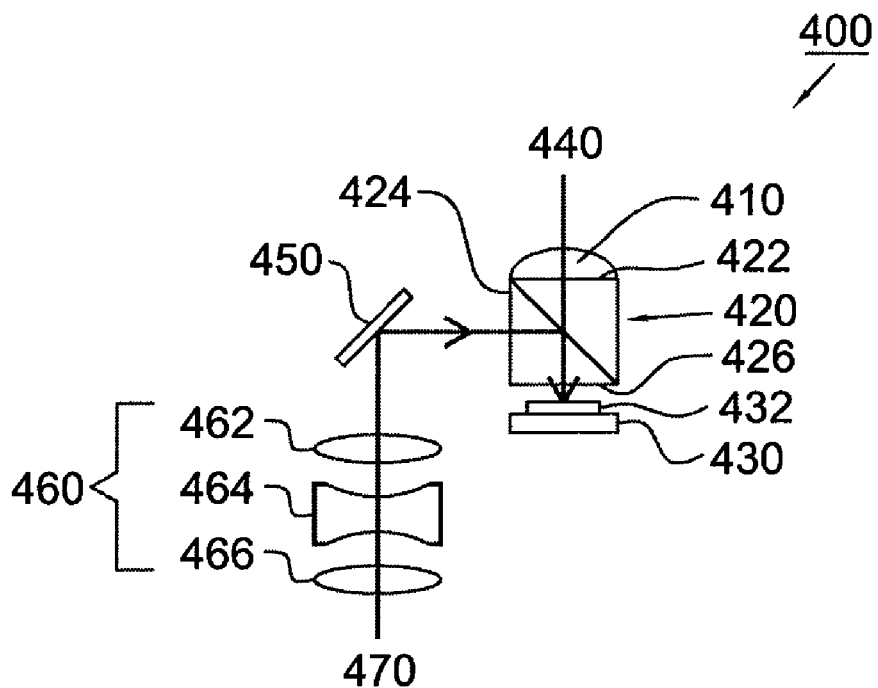
Figure 6A:
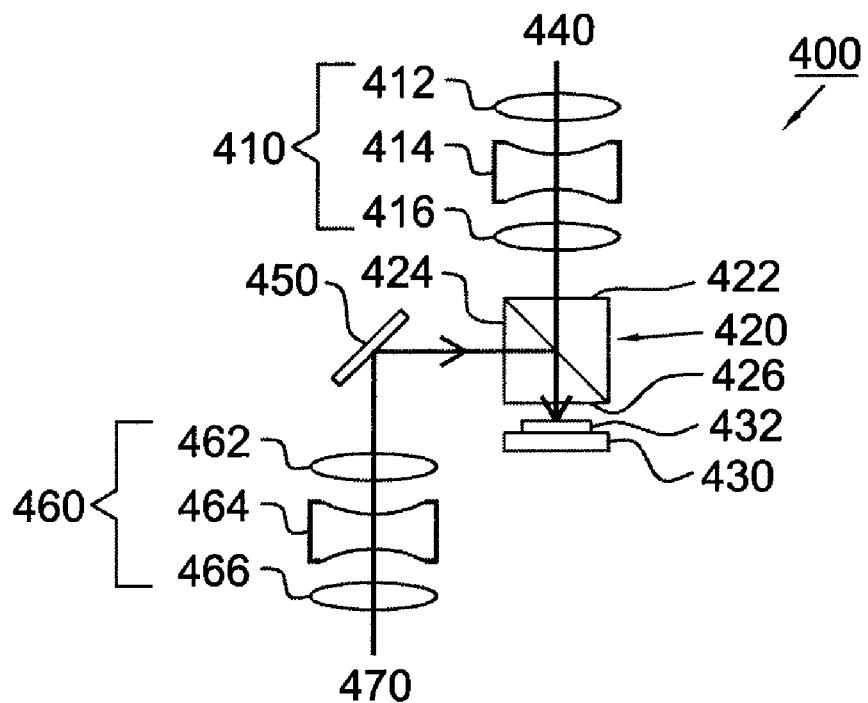
Figure 6B:
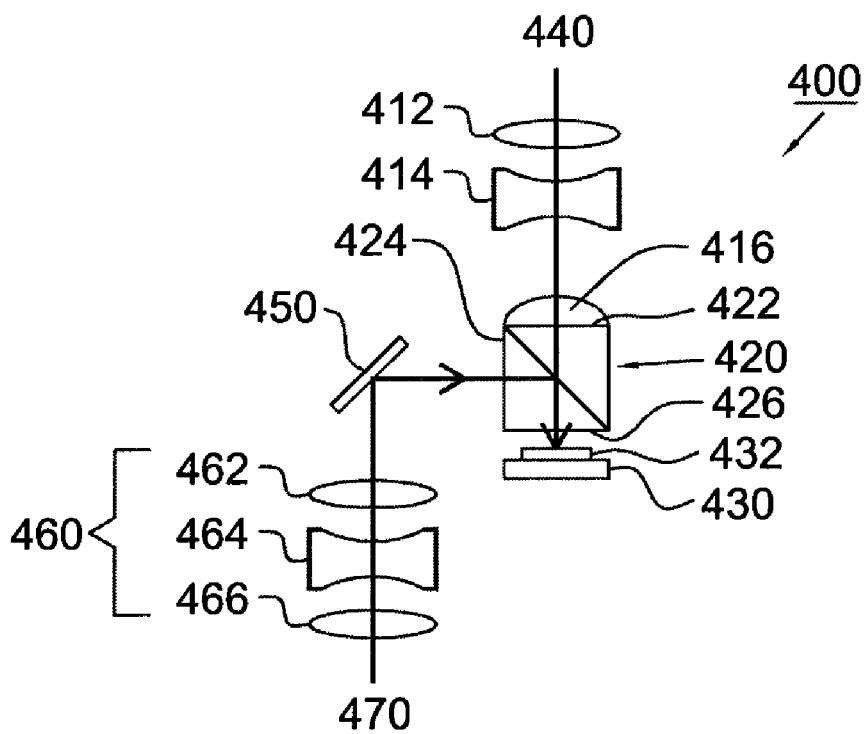
Figure 7:
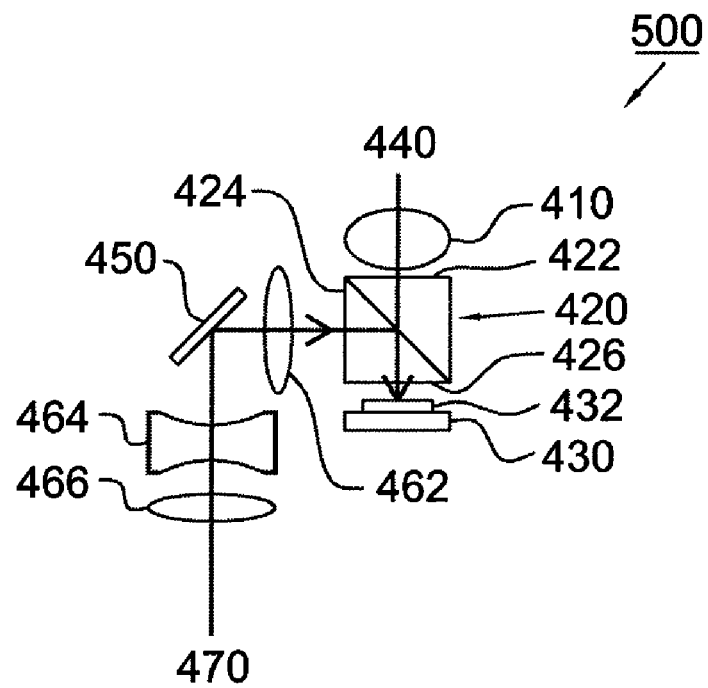
FIGS. 7, 8, 9a and 9b illustrate various aspects of the camera modules for portable electronic devices according to the second embodiment of the present invention.
Figure 8:
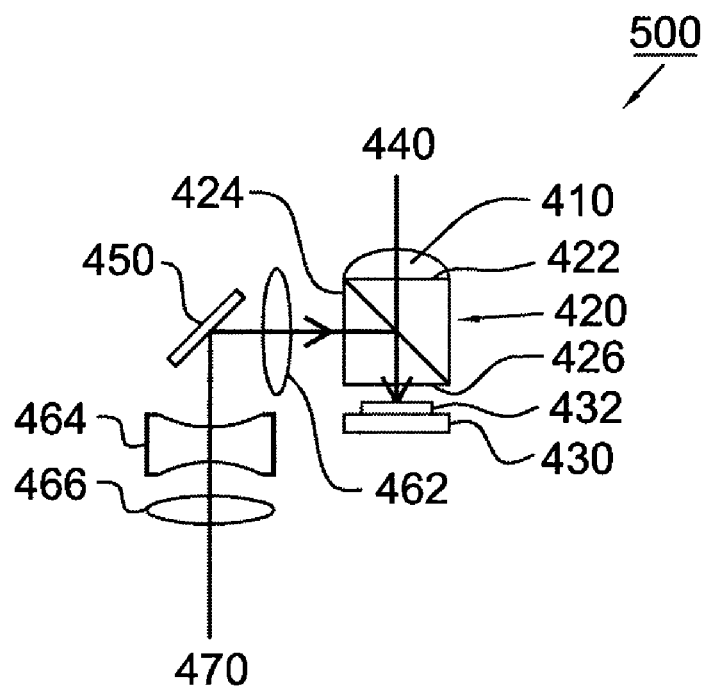
Figure 9A:
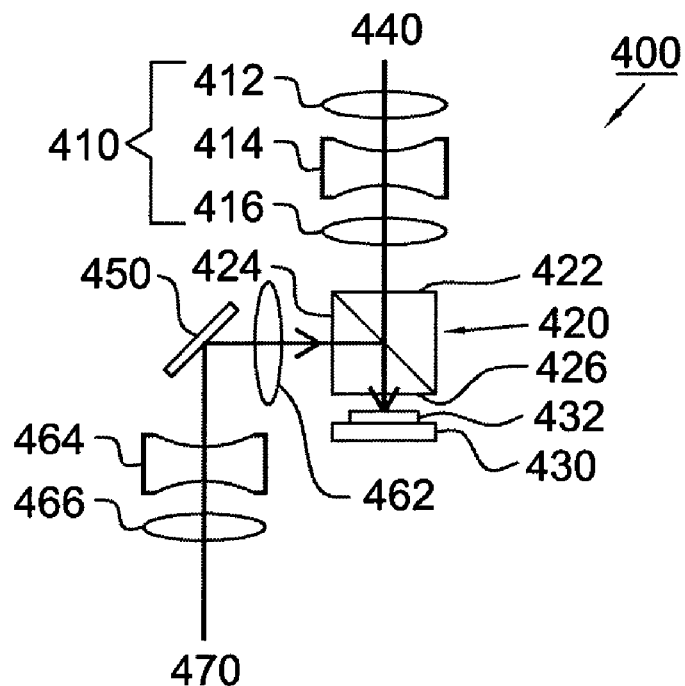
Figure 9B:
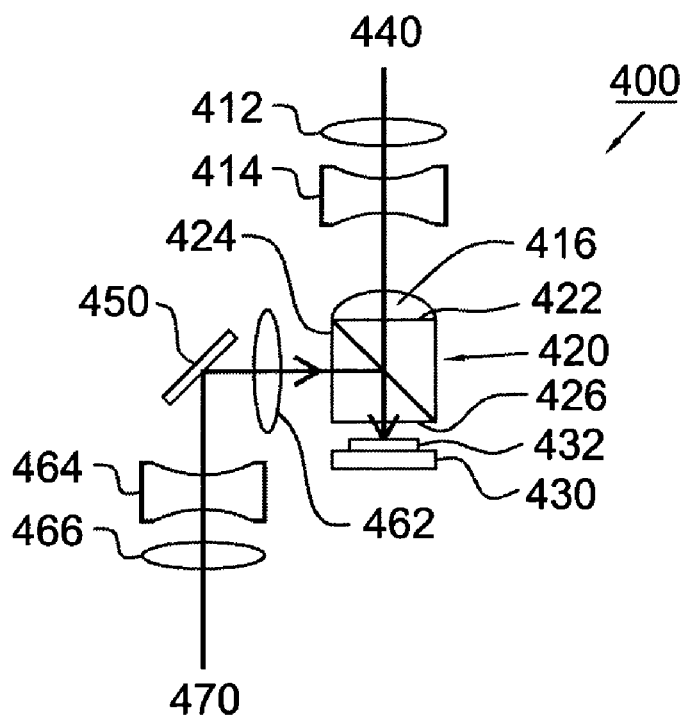

Referring to FIG. 5, to reduce the profile of the camera module 400, the second lens unit 410 can be a single convex lens and attached to the light input end 422 of the beam splitter 420. In addition, referring to FIG. 6a, the second lens unit 410 can be a tri-lens module comprised of two convex lenses 412, 416 and a concave lens 414 disposed between the two convex lenses 412, 416 so as to enhance the image resolution. Besides, referring to FIG. 6b, the convex lens 416 can also be attached to the light input end 422 of the beam splitter 420 to reduce the profile of the camera module 400. When the second lens unit 410 is a tri-lens module to enhance the image resolution, it can be configured to function as the optical elements of the still camera module in a cell phone. The concave lens 414 of the second lens unit 410 and the concave lens 464 of the first lens unit 460 are adapted to correct the aberration to enhance image quality.

Referring to FIGS. 7, 8, 9a and 9b, the camera modules 500 for portable electronic devices according to the second embodiment of the present invention are respectively similar to the camera modules 400 illustrated in FIGS. 4, 5, 6a and 6b and the difference between them is only in that the convex lens 462 in the camera module 500 is positioned between the reflector 450 and the light input end 424 of the beam splitter 420. The convex lens 466 and the concave lens 464 in the camera module 500 according to the second embodiment of the present invention work to receive the image light beam 470 and guide it to the reflector 450. The image light beam 470 is then redirected to the convex lens 462 by the reflector 450 and guided to the light input end 424 of the beam splitter 420 by the convex lens 462.

Figure 10:
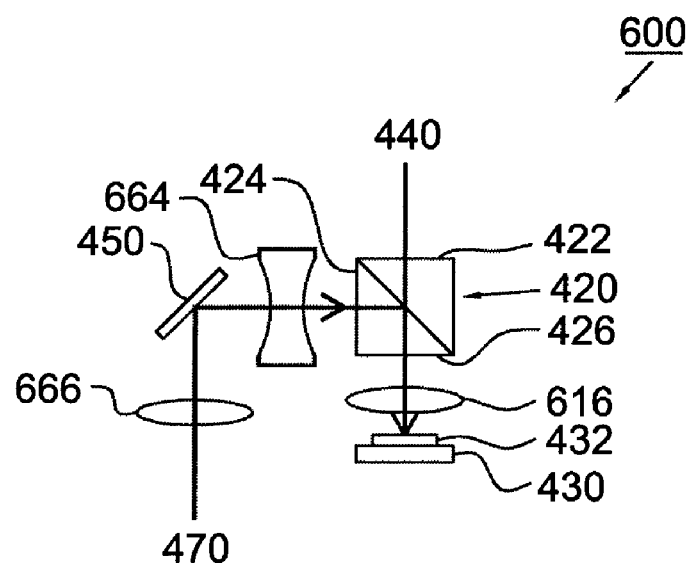
FIGS. 10 and 11 illustrate various aspects of the camera modules for portable electronic devices according to the third embodiment of the present invention.

Referring to FIG. 10, the camera module 600 for portable electronic devices according to the third embodiment of the present invention is similar to the camera module 400 of FIG. 4 and also includes the beam splitter 420, IR cut filter 432, image sensor 430 and reflector 450. A convex lens 616 is positioned between the light output end 426 of the beam splitter 420 and the image sensor 430. A convex lens 666 is positioned at the upstream of the reflector 450 and a concave lens 664 is positioned between the reflector 450 and the light input end 424 of the beam splitter 420. When the image light beam 440 enters into the light input end 422 and then is outputted from the light output end 426 of the beam splitter 420, the convex lens 616 will collect and guide the image light beam 440 to the image sensor 430. In addition, the image light beam 470 is collected and guided to the reflector 450 by the convex lens 666. The image light beam 470 is then reflected by the reflector 450, pass through the concave lens 664 and reach the light input end 424 of the beam splitter 420. The image light beam 470 will enter into the light input end 424 and then be outputted from the light output end 426 of the beam splitter 420. The convex lens 616 collects and guides the image light beam 470 outputted from the light output end 426 to the image sensor 430.

According to the third embodiment of the present invention, the function of the convex lens 616 is the same as that of the convex lens 410 and the convex lens 666, concave lens 664 and convex lens 616 in combination has the function identical to that of the first lens unit 460. Thus, any further illustrations of those lenses are omitted herein. Since the camera module 600 in this embodiment has one less convex lens than the camera module 400 illustrated in FIG. 4, the production cost and profile of the camera module 600 can be further reduced accordingly.

Figure 11:
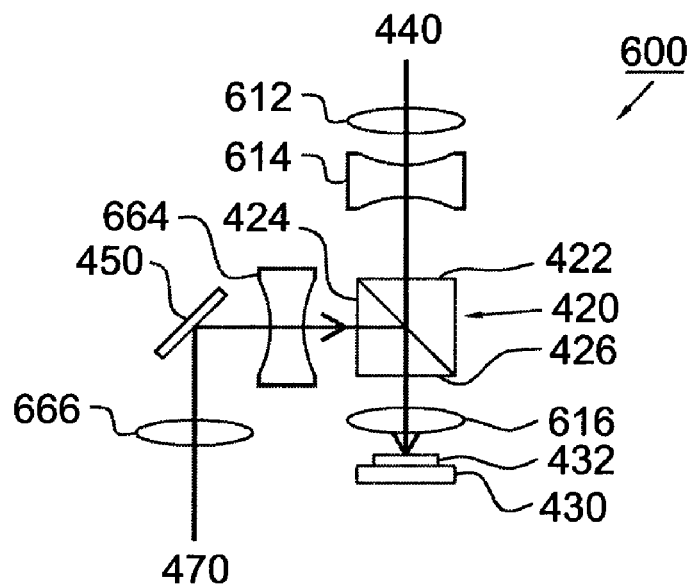

Referring to FIG. 11, the camera module 600 can further include a convex lens 612 positioned at the upstream of the light input end 422 of the beam splitter 420 and a concave lens 614 positioned between the convex lens 612 and the light input end 422. The convex lens 612 and concave lens 614 receive the image light beam 440 in sequence and then guide it to the light input end 422 of the beam splitter 420. The lenses 612 and 614 together have the function of enhancing the image resolution.

Figure 12:
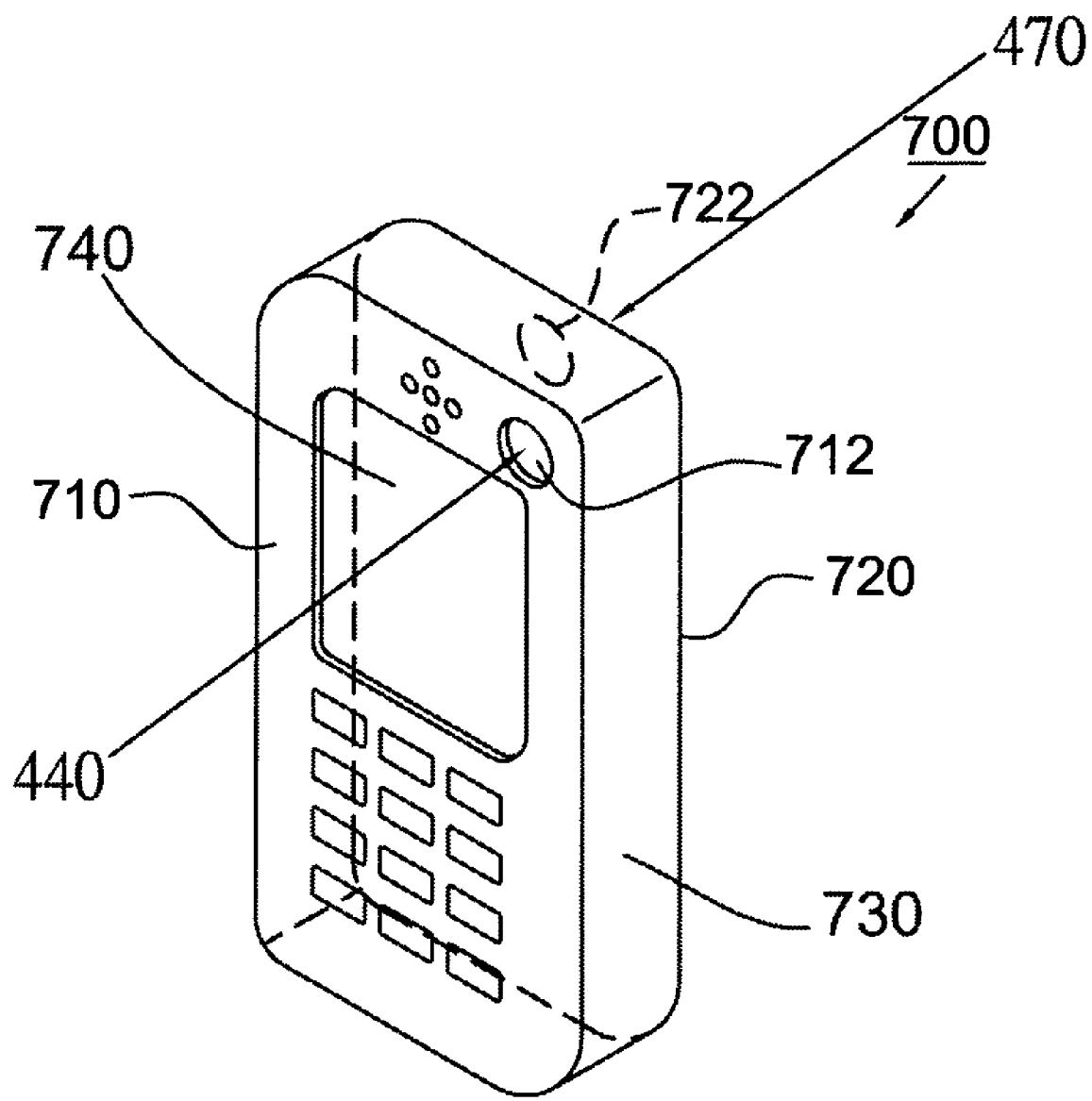
FIG. 12 illustrates a cell phone provided with the camera modules for portable electronic devices of the present invention.

Referring to FIG. 12, the camera modules 400, 500 and 600 of the present invention can be configured in a portable electronic device 700 with functions of photographing and making a video call, such as third generation (3G) cell phone. The portable electronic device 700 has a housing 730 and a camera module 400, 500 or 600 in the housing 730 (not shown in the figure). The housing 730 has an opening 712 formed on the front side 710 and another opening 722 formed on the backside 720. The image light beam 440 can pass in sequence through the opening 712 and the optical components of the camera module 400, 500 or 600, and finally arrive at the image sensor 430 of the camera module 400, 500 or 600. Similarly, the image light beam 470 will pass in sequence through the opening 722 and the optical components of the camera module 400, 500 or 600, and finally also arrive at the image sensor 430. The image sensor 430 converts the image light beams 440, 470 into individual corresponding electrical signals, and a display unit 740 disposed on the front side 710 of the housing 730 then shows the images received by the image sensor 430 according to the electrical signals. It should be noted that in general, the image light beams 440 and 470 will not arrive at the image sensor 430 simultaneously. Since the camera modules 400, 500 and 600 have been discussed in detail in the foregoing embodiments, any further illustrations of those camera modules are omitted herein.

The camera modules according to the present invention have the same functions of conventional video and still camera modules and can be manufactured with lower cost and smaller size by sharing components without modifying the original modulation transfer function (MTF) of the optical system. In addition, extra lenses can be added to the secondary camera module of lower resolution to enhance its resolution per demand.

It is to be noted that the above-mentioned embodiments are only the preferred embodiments of the present invention; the camera modules of the present invention mainly include a beam splitter 420, a reflector 450 and an image sensor 430 to achieve the object of reducing the production cost and profile of the camera module by sharing components. Briefly, the reflector 450 redirects the image light beam 470 to the light input end 424 of the beam splitter 420. Afterward, the image light beam 470 is outputted from the light output end 426 of the beam splitter 420 and finally arrives at the image sensor 430. Similarly, the image light beam 440 enters into the light input end 422 of the beam splitter 420 and then is outputted from the light output end 426 of the beam splitter 420 to arrive at the image sensor 430.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A camera module for a portable electronic device, comprising:
    a beam splitter having a first light input end for receiving a first light beam, a second light input end for receiving a second light beam from a second direction and a light output end for outputting the first or second light beam;
    a reflector positioned at the upstream of the first light input end of the beam splitter for receiving the first light beam from a first direction and redirecting the first light beam to the first light input end of the beam splitter, wherein the first direction is different from the second direction; and
    an image sensor positioned at the downstream of the light output end of the beam splitter for converting the first or second light beam outputted from the light output end into a corresponding signal.

2. The camera module as claimed in claim 1, further comprising:
    a first lens unit positioned at the upstream of the reflector for receiving the first light beam and then guiding the first light beam to the reflector; and
    a second lens unit positioned at the upstream of the second light input end of the beam splitter for receiving the second light beam and then guiding the second light beam to the second light input end of the beam splitter.

3. The camera module as claimed in claim 1, further comprising:
    a first convex lens positioned between the reflector and the first light input end of the beam splitter for guiding the first light beam redirected by the reflector to the first light input end of the beam splitter;
    a concave lens positioned at the upstream of the reflector;
    a second convex lens positioned at the upstream of the concave lens, wherein the second convex lens and the concave lens are adapted to receive the first light beam in sequence and then guide the first light beam to the reflector; and
    a lens unit positioned at the upstream of the second light input end of the beam splitter for receiving the second light beam and then guiding the second light beam to the second light input end of the beam splitter.

4. The camera module as claimed in claim 2, wherein the first lens unit comprises:
    a first convex lens;
    a second convex lens; and
    a concave lens positioned between the first and second convex lenses.

5. The camera module as claimed in claim 2, wherein the second lens unit is a convex lens and attached to the second light input end of the beam splitter.

6. The camera module as claimed in claim 2, wherein the second lens unit comprises:
    a first convex lens;
    a second convex lens; and
    a concave lens positioned between the first and second convex lenses.

7. The camera module as claimed in claim 3, wherein the lens unit is a convex lens and attached to the second light input end of the beam splitter.

8. The camera module as claimed in claim 3, wherein the lens unit comprises:
    a first convex lens;
    a second convex lens; and
    a concave lens positioned between the first and second convex lenses.

9. The camera module as claimed in claim 6, wherein the first convex lens is attached to the second light input end of the beam splitter.

10. A portable electronic device, comprising:
    a housing having a first side, a second side opposite to the first side, a first opening positioned on the first side for receiving a first light beam and a second opening positioned on the second side for receiving a second light beam; and a camera module positioned within the housing, comprising:
  a beam splitter having a first light input end for receiving the first light beam, a second light input end for receiving the second light beam from a second direction and a light output end for outputting the first or second light beam;
  a reflector positioned at the upstream of the first light input end of the beam splitter for receiving the first light beam from a first direction and redirecting the first light beam to the first light input end of the beam splitter, wherein the first direction is different from the second direction; and
  an image sensor positioned at the downstream of the light output end of the beam splitter for converting the first or second light beam outputted from the light output end into a corresponding signal.

11. The portable electronic device as claimed in claim 10, further comprising:
  a display unit disposed on the housing for showing images according to the corresponding signal converted by the image sensor.

12. The portable electronic device as claimed in claim 10, wherein the camera module further comprises:
  a first lens unit positioned at the upstream of the reflector for receiving the first light beam and then guiding the first light beam to the reflector; and
  a second lens unit positioned at the upstream of the second light input end of the beam splitter for receiving the second light beam and then guiding the second light beam to the second light input end of the beam splitter.

13. The portable electronic device as claimed in claim 10, wherein the camera module further comprises:
  a first convex lens positioned between the reflector and the first light input end of the beam splitter for guiding the first light beam redirected by the reflector to the first light input end of the beam splitter;
  a concave lens positioned at the upstream of the reflector;
  a second convex lens positioned at the upstream of the concave lens, wherein the second convex lens and the concave lens are adapted to receive the first light beam in sequence and then guide the first light beam to the reflector; and
  a lens unit positioned at the upstream of the second light input end of the beam splitter for receiving the second light beam and then guiding the second light beam to the second light input end of the beam splitter.

14. The portable electronic device as claimed in claim 10, wherein the camera module further comprises:
  a first convex lens positioned between the light output end of the beam splitter and the image sensor;
  a first concave lens positioned between the reflector and the first light input end of the beam splitter for guiding the first light beam redirected by the reflector to the first light input end of the beam splitter; and
  a second convex lens positioned at the upstream of the reflector for receiving the first light beam and then guiding the first light beam to the reflector.

15. The portable electronic device as claimed in claim 12, wherein the first lens unit comprises:
  a first convex lens;
  a second convex lens; and
  a concave lens positioned between the first and second convex lenses.

16. The portable electronic device as claimed in claim 12, wherein the second lens unit is a convex lens and attached to the second light input end of the beam splitter.

17. The portable electronic device as claimed in claim 12, wherein the second lens unit comprises:
  a first convex lens;
  a second convex lens; and
  a concave lens positioned between the first and second convex lenses.

18. The portable electronic device as claimed in claim 13, wherein the lens unit is a convex lens and attached to the second light input end of the beam splitter.

19. The portable electronic device as claimed in claim 13, wherein the lens unit comprises:
  a first convex lens;
  a second convex lens; and
  a concave lens positioned between the first and second convex lenses.

20. The portable electronic device as claimed in claim 14, wherein the camera module further comprises:
  a second concave lens positioned at the upstream of the second light input end of the beam splitter; and
  a third convex lens positioned at the upstream of the second concave lens, wherein the third convex lens and second concave lens are adapted to receive the second light beam in sequence and then guide the second light beam to the second light input end of the beam splitter.

21. A camera module for a portable electronic device, comprising:
  a beam splitter having a first light input end for receiving a first light beam, a second light input end for receiving a second light beam from a second direction and a light output end for outputting the first or second light beam;
  a reflector positioned at the upstream of the first light input end of the beam splitter for receiving the first light beam from a first direction and redirecting the first light beam to the first light input end of the beam splitter, wherein the first direction is different from the second direction;
  an image sensor positioned at the downstream of the light output end of the beam splitter for converting the first or second light beam outputted from the light output end into a corresponding signal;
  a first convex lens positioned between the light output end of the beam splitter and the image sensor;
  a first concave lens positioned between the reflector and the first light input end of the beam splitter for guiding the first light beam redirected by the reflector to the first light input end of the beam splitter; and
  a second convex lens positioned at the upstream of the reflector for receiving the first light beam and then guiding the first light beam to the reflector.

22. The camera module as claimed in claim 21, further comprising:
  a second concave lens positioned at the upstream of the second light input end of the beam splitter; and
  a third convex lens positioned at the upstream of the second concave lens, wherein the third convex lens and second concave lens are adapted to receive the second light beam in sequence and then guide the second light beam to the second light input end of the beam splitter.

* * * * *